R. E. CARTZDAFNER.
DUMP CAR.
APPLICATION FILED OCT. 27, 1916.

1,375,561.

Patented Apr. 19, 1921.
10 SHEETS—SHEET 1.

Inventor
Roy E. Cartzdafner
By his Attorneys
Emery, Booth, Janney & Varney

R. E. CARTZDAFNER.
DUMP CAR.
APPLICATION FILED OCT. 27, 1916.

1,375,561.

Patented Apr. 19, 1921.
10 SHEETS—SHEET 5.

Inventor
Roy E. Cartzdafner
By his Attorneys
Emery, Booth, Janney & Varney

R. E. CARTZDAFNER.
DUMP CAR.
APPLICATION FILED OCT. 27, 1916.

1,375,561.

Patented Apr. 19, 1921.
10 SHEETS—SHEET 6.

Inventor
Roy E. Cartzdafner
By his Attorneys
Emery, Booth, Janney & Varney

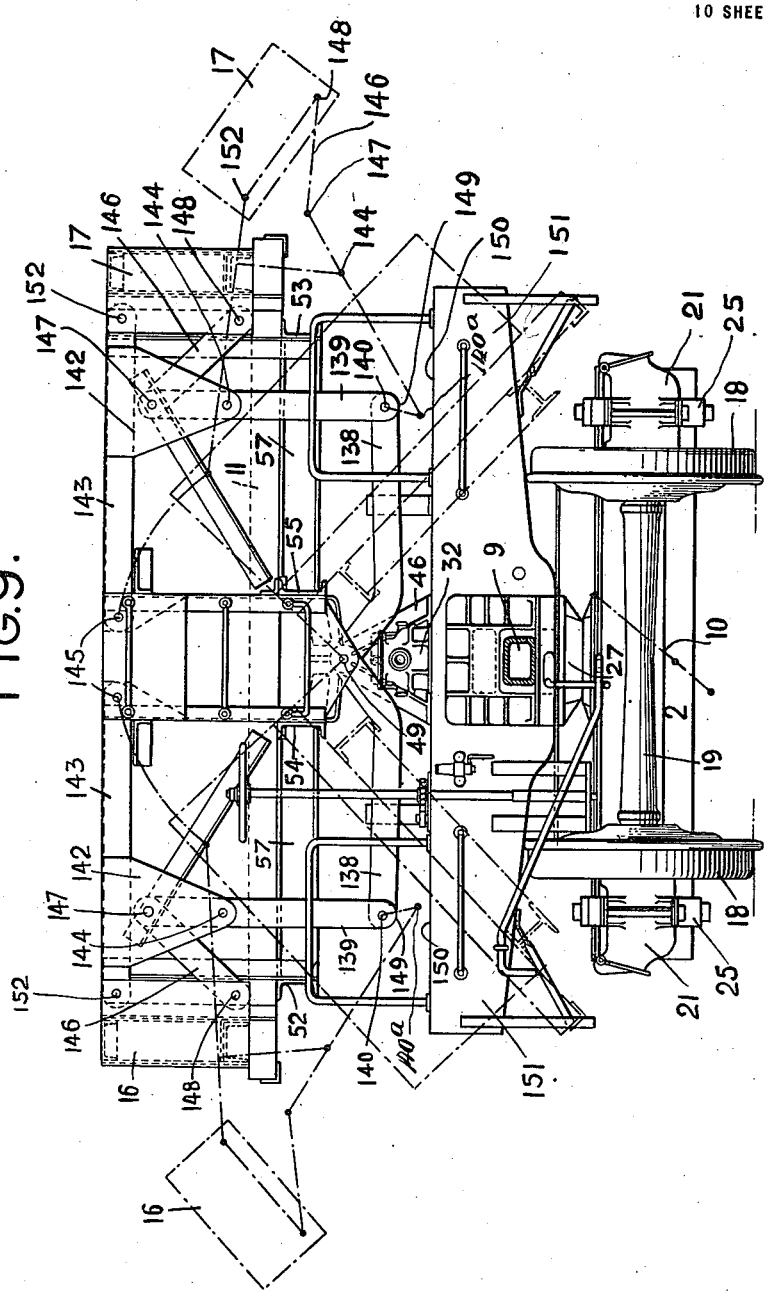

FIG.10.

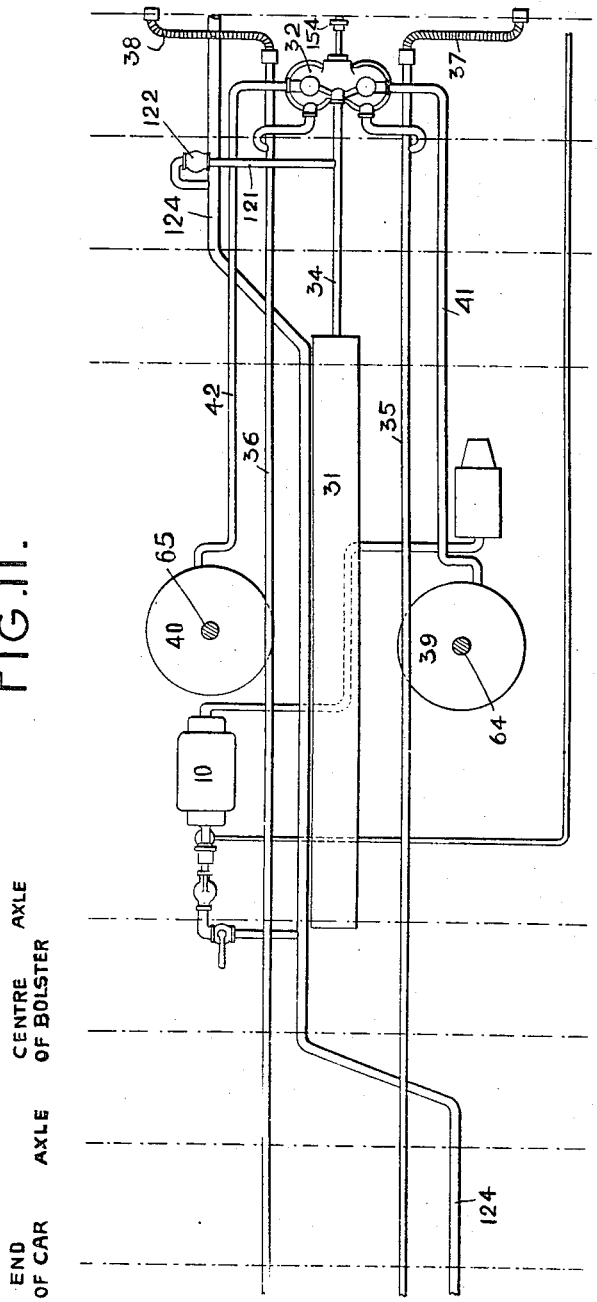

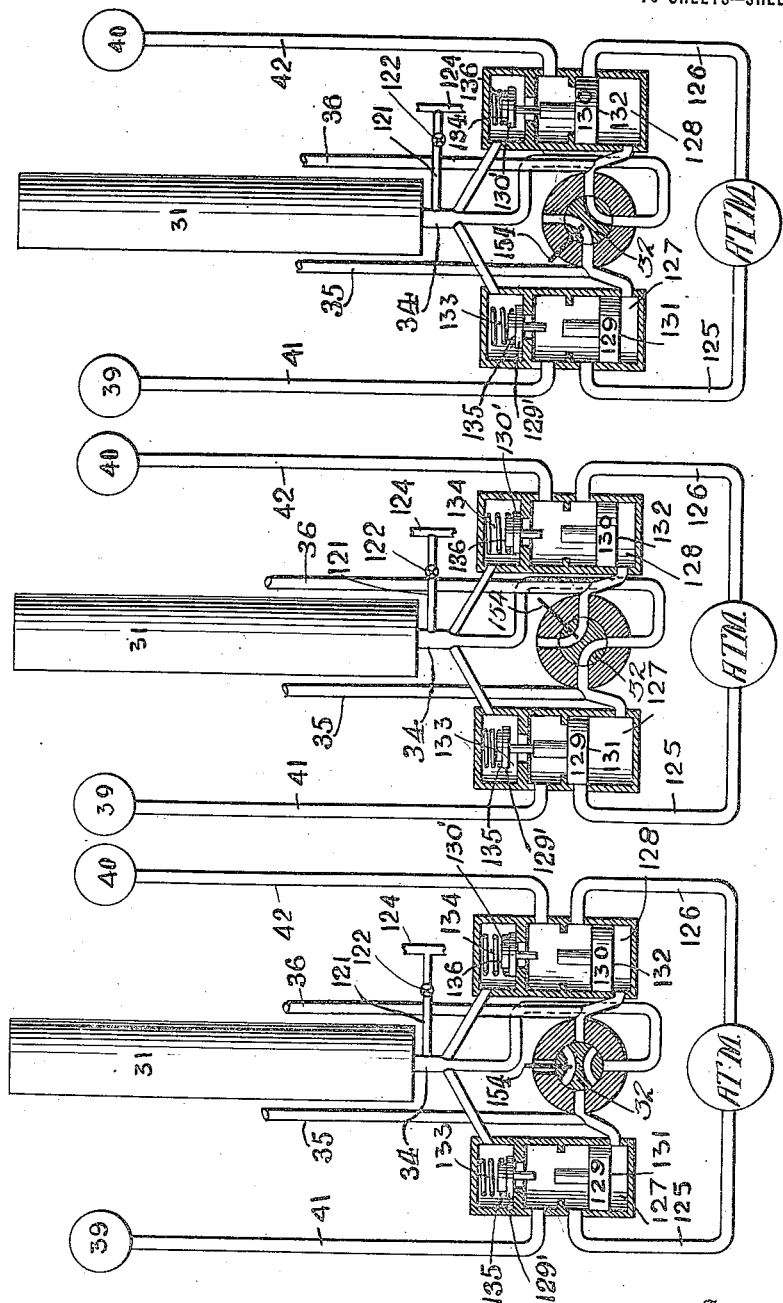

UNITED STATES PATENT OFFICE.

ROY E. CARTZDAFNER, OF PASSAIC, NEW JERSEY, ASSIGNOR TO MAGOR CAR CORPORATION, OF NEW YORK, N. Y., A CORPORATION OF NEW YORK.

DUMP-CAR.

1,375,561.

Specification of Letters Patent.   Patented Apr. 19, 1921.

Application filed October 27, 1916. Serial No. 128,110.

*To all whom it may concern:*

Be it known that I, ROY E. CARTZDAFNER, a citizen of the United States, and a resident of Passaic, in the county of Passaic and State of New Jersey, have invented an Improvement in Dump-Cars, of which the following is a specification.

This invention relates to dump cars, and with regard to certain more specific features, to a pneumatically operated car whose body is adapted to be rotated either way from horizontal.

Among the objects of the invention may be noted the provision of a car body supported by members under compression, so that any transverse sagging of the car floor decreases the clearance; the provision of a car in which the supports are automatically unlocked prior to the dumping operation and automatically relocked prior to the time the car is again righted; the provision of an improved linkage for opening the doors or sides of the car and lifting them above the plane of the car body automatically as the car swings into dumping position and automatically restoring the door to closed position during the righting movement and locking it securely closed while the car is in normal position; the provision of an improved arrangement of shock absorbers for resiliently limiting the dumping movement of the car; and the provision of a number of safety devices conducive to reliable and effective operation, and freedom from accidental dumping, during the severe service conditions required of such cars.

Other objects will be in part obvious and in part pointed out hereinafter.

The invention accordingly comprises the features of construction and operation, combinations of elements, and arrangements of parts which are exemplified in the structure hereinafter described and the scope of the application of which will be indicated in the following claims.

In the accompanying drawings, in which is shown one of various possible embodiments of this invention, Figure 1 is a horizontal section on the line 1—1 of Fig. 3, showing half of a car in plan, with the car floor removed.

Fig. 9 is an end elevation of the car in its normal or horizontal position illustrated in Figs. 1 to 5 and 8, with dotted line outlines indicating the relation of the several parts when the car is in either of its two dumping positions.

Fig. 10 is a similar view, showing the car in its position for dumping toward the left.

Fig. 11 is a diagrammatic illustration of a preferred arrangement of piping, indicating the air circuits when the operating valve is in neutral position.

Figure 1:
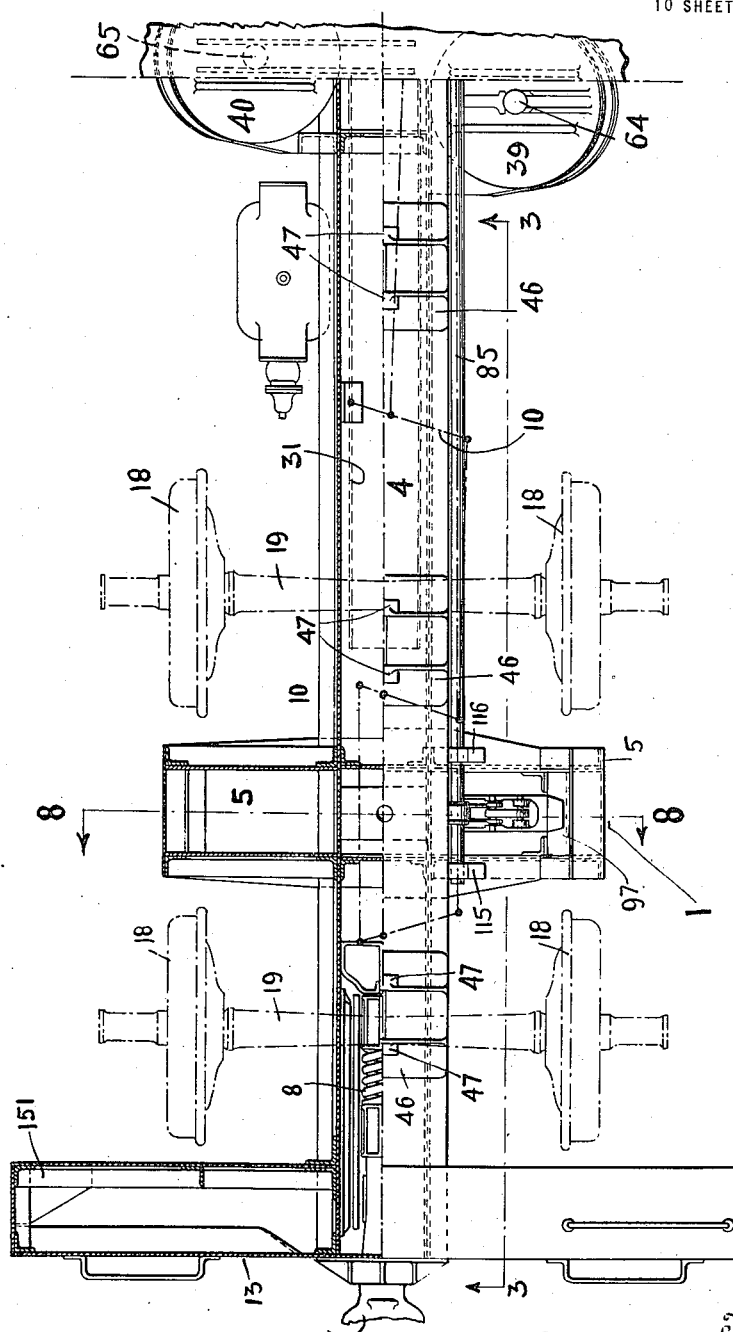
Figure 2:
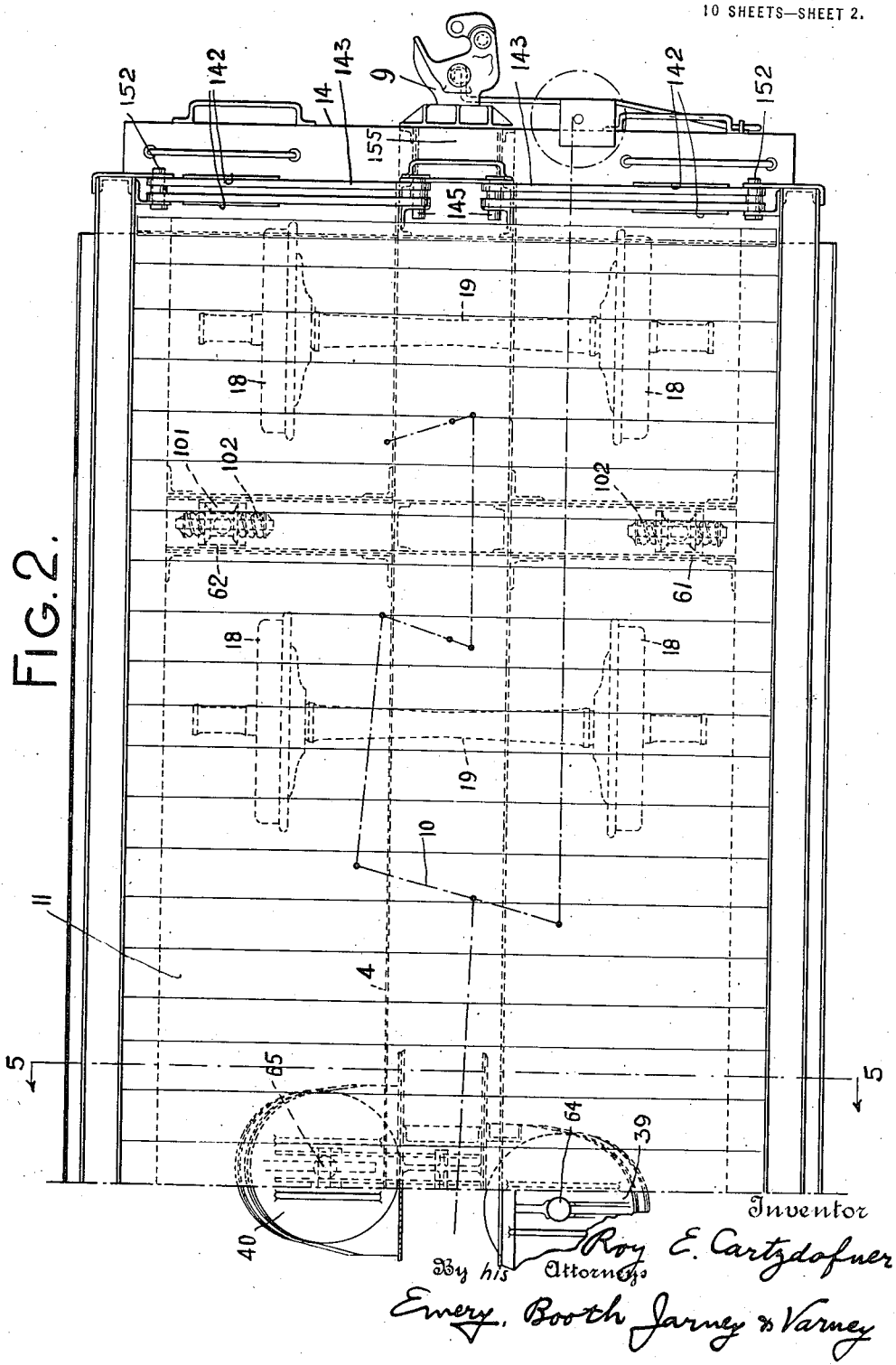
Fig. 2 is a plan of the other half of the car shown in Fig. 1.
Figure 3:
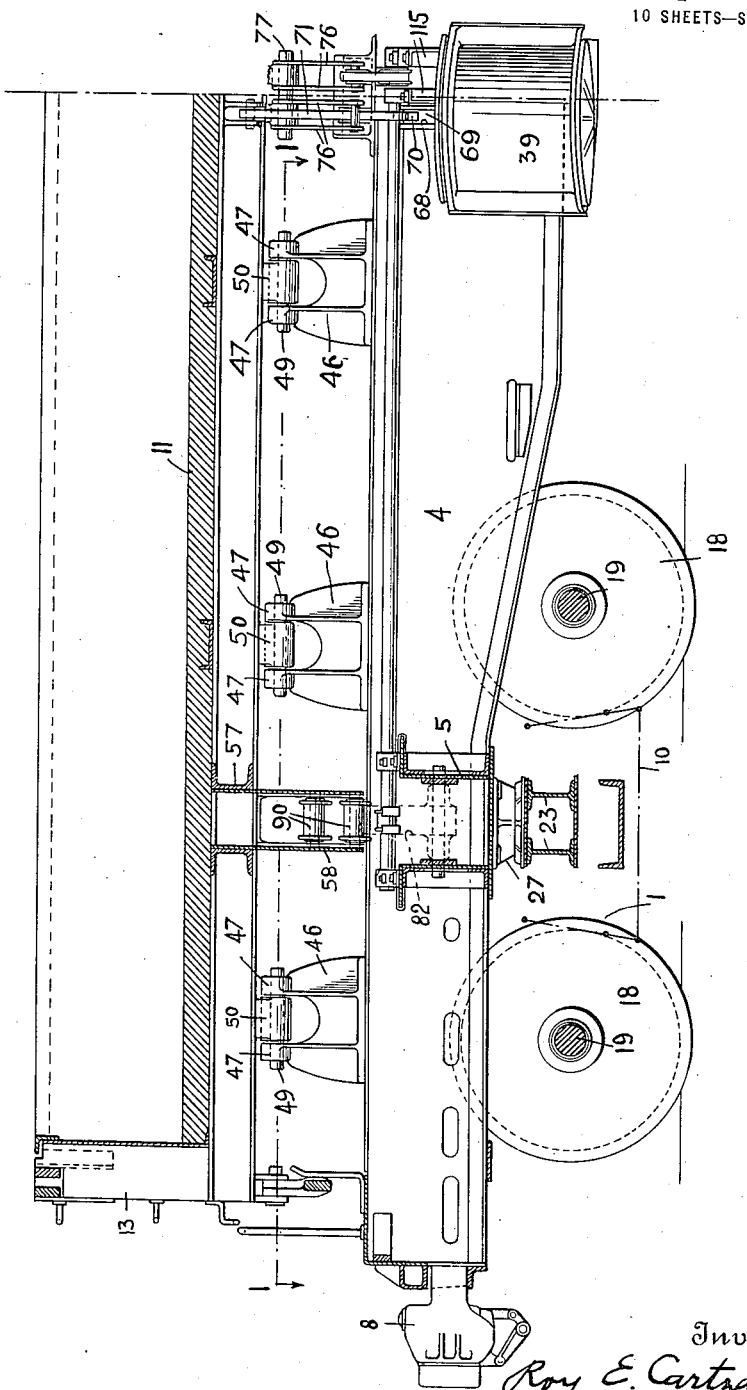
Fig. 3 is a vertical longitudinal section on the line 3—3 of Fig. 1, showing half of the car, including the floor.
Figure 4:
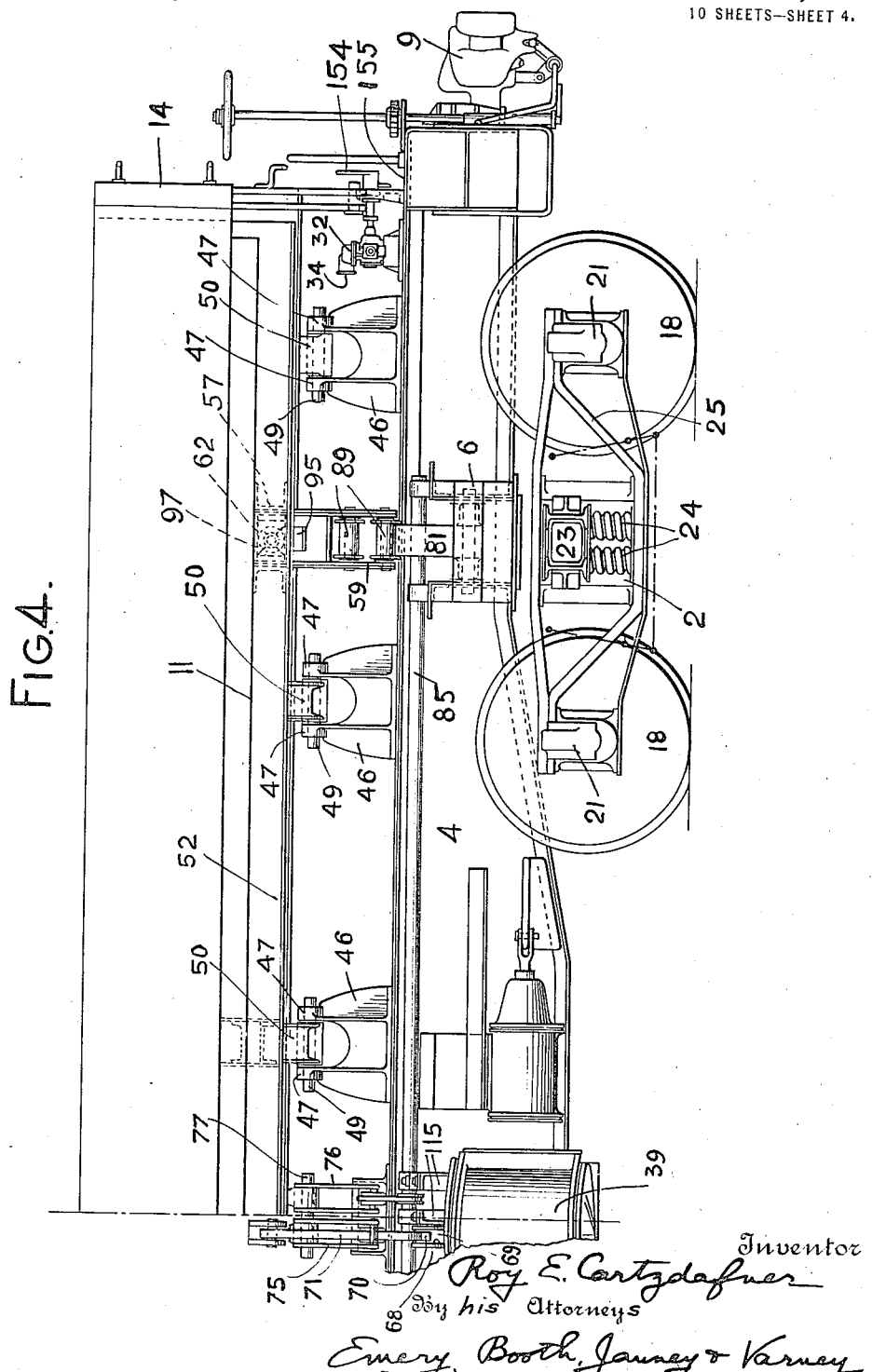
Fig. 4 is a longitudinal elevation of Fig. 2, showing the other half of the car.

Figs. 12, 13 and 14 are diagrammatic illustrations of the arrangement of circuits throughout the car when the valve is in its various operating positions: of these, Fig. 12 corresponds to the neutral position of the valve; Fig. 13 indicates the position for dumping toward the right or righting from the left; and Fig. 14 indicates the circuits during dumping toward the left or righting from the right.

Referring now to the accompanying drawings, and more particularly to Figs. 1 to 4 thereof, there is illustrated a double-truck car comprising the trucks 1, 2, center sill 4, bolsters 5, 6, draft-rigging 8, 9, brake-rigging 10; floor 11, ends 13, 14, and sides or doors 16, 17.

Each truck comprises two pairs of wheels 18 whose axles 19 are mounted in the journal boxes 21 upon which the truck bolsters 23 are carried through the medium of springs 24 and frames 25.

Figure 8:
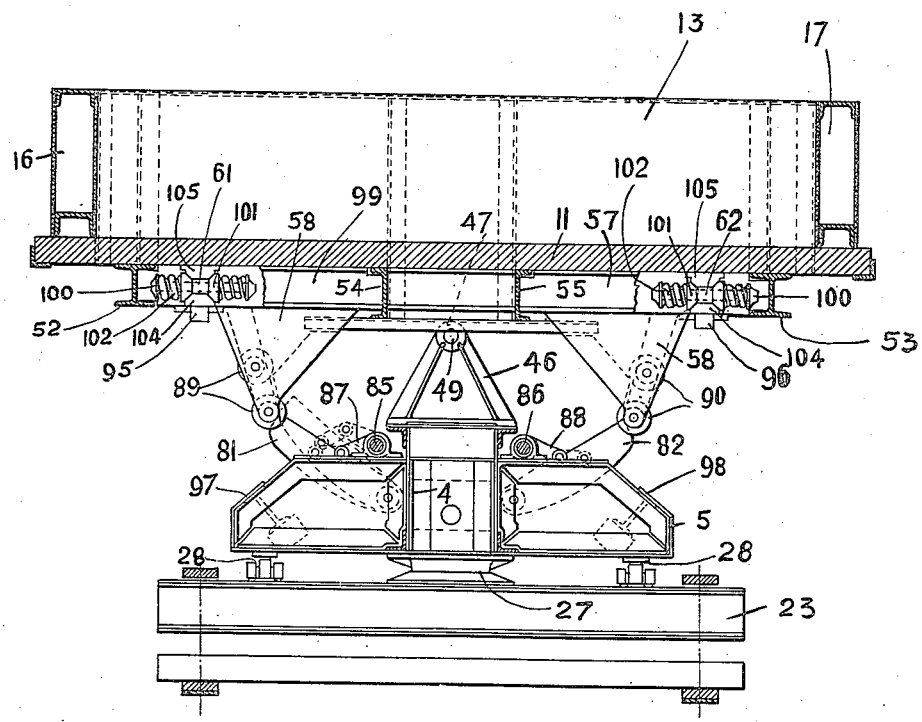
Fig. 8 is a transverse sectional elevation on the line 8—8 of Fig. 1, showing the arrangement of parts at one of the bolsters.

The center sill 4 and bolsters 5, 6, secured thereto are pivotally supported upon the truck bolsters 23 at the center bearings 27 and side bearings 28, shown best in Fig. 8. Safety chains may be provided, if desired, to limit the rotation of the truck about the king-pin with respect to the center sill and body bolsters. Upon the center sill and body bolster are mounted the draft-rigging 8, 9 and brake-rigging 10, of any suitable type, and in addition there are provided certain devices associated with the dumping features of the car, such as the reservoir 31, valve 32, pipe 34 from reservoir to valve, auxiliary train-line pipes 35, 36 connected with the valve 32 and adapted, as by the flexible hose 37, 38, for connection to similar auxiliary train-lines on adjacent cars of the train. The dumping cylinders 39, 40, hereinafter more fully described, are likewise mounted on opposite sides of the center sill 4 and may be connected to the valve 32 by means of the supply pipes 41, 42, respectively. The standards 46 arranged at suitable intervals along the top of the center sill are each provided with spaced bearings 47 to receive the coaxial pivot pins 49 upon which are mounted depending members 50 secured to the car floor 11. In addition to these elements, the center sill carries a portion of the mechanism associated with the dumping cylinders 39, 40, hereinafter described.

The part of the car body that is pivotally mounted upon the pins 49 to swing one way or the other from horizontal for dumping purposes, comprises the floor 11, the depending members 50 above described as secured thereto for connection to the pivot pin 49, the ends 13, 14, and the sides 16, 17, hereinafter described. The floor preferably comprises side sills 52, 53, and central sills or channels supporting the wooden flooring 11 and secured to each other by spaced bunks or bolsters upon which the depending members 50 are mounted. In this way the weight of the dumping portion of the car and its load is borne by the center sills 54, 55 and transmitted through the depending members 50, pivot pins 49 and standards 46, to the center sill 4 mounted on the trucks 1, 2. By providing a number of pivot pins and associated parts suitably spaced lengthwise of the car, the load may be distributed to any desired extent, thereby obviating any necessity for heavy sills or plates in the car floor. And by thus decreasing the required dead weight of the car floor, there is a corresponding decrease in the strains and shocks incident to the vibration of the oscillating floor in service, and likewise a decrease in the power and size of parts needed to effect the dumping operations. At one or more points under each side of the car floor and preferably between the floor bolsters 57, there is a depending roller support 58, 59, and a friction or double-wedge shock absorber 61, 62, both associated with the dumping operations hereinafter described.

The power for operating the dumping cylinders 39, 40 may be obtained and transmitted to the cylinders selectively in any desired way, but preferably this power is compressed air procured initially from the locomotive or other source of supply, and stored in the reservoir 31, whence it may be directed at will to the cylinders 39, 40, by means of a manually operated valve 32, which is preferably of the type illustrated, described and claimed in an application of Cartzdafner and Ketcham, Serial No. 128,349, filed October 28, 1916. By operating the valve 32 into its position for dumping toward the left (Figs. 7, 9 and 10), for example, the left auxiliary train-line 35 is exhausted to atmosphere to exhaust the left dumping cylinder 39, and simultaneously the right auxiliary train-line 36 is connected to reservoir to energize the right dumping cylinder 40. When the piston 65 of the latter has completed its upward or working stroke due to this pressure beneath it, the supply of air to the cylinder may be automatically cut off if desired, or it may be left to the discretion of the operator to shift the valve to its neutral position when the dumping has been effected. In order to right the car from this left-hand dumping position illustrated in Figs. 7 and 10, the valve 32 is shifted into its position for dumping toward the right (Figs. 7, 9 and 10), thereby exhausting the right auxiliary train-line 36 and right cylinder 40 connected thereto, and simultaneously connecting the left auxiliary train-line 35 and left cylinder 39 to reservoir. The upward travel of the piston 64 of the left cylinder serves to right the car, through the mechanical connections hereinafter described. In other words, the car may be dumped toward the left or righted from the right by energizing the right-hand dumping cylinder 40; and may be dumped toward the right or righted from the left by energizing the left-hand cylinder 39.

The dumping mechanism includes the pair of dumping cylinders 39 and 40 above mentioned, provided with the pistons 64, 65, and the connections from the supply pipes 41, 42, to the portions of the cylinders beneath the pistons, so that air applied to the cylinders causes the pistons to rise. The pistons fall of their own weight, or if preferred, some suitable means may be provided for forcing the pistons downward when they have reached the end of their working stroke. Each piston moves in vertical guides 67, 68, the inner guides 67 serving simply to direct the travel of the piston, and the outer guides 68 performing this function and in addition being provided with beveled surfaces 69 to guide the tails 70 of the notched dumping links 71, 72, during the downward movement of the latter into dumping position, as hereinafter described. Through the medium of a pair of connecting links 73, 74, attached to the upper end of each piston, motion is transmitted from the piston to a dumping member 75, 76, formed preferably of a pair of spaced plates pivoted as at the pivot pin 77, coaxially with the center of oscillation of the car floor 11.

Figure 5:
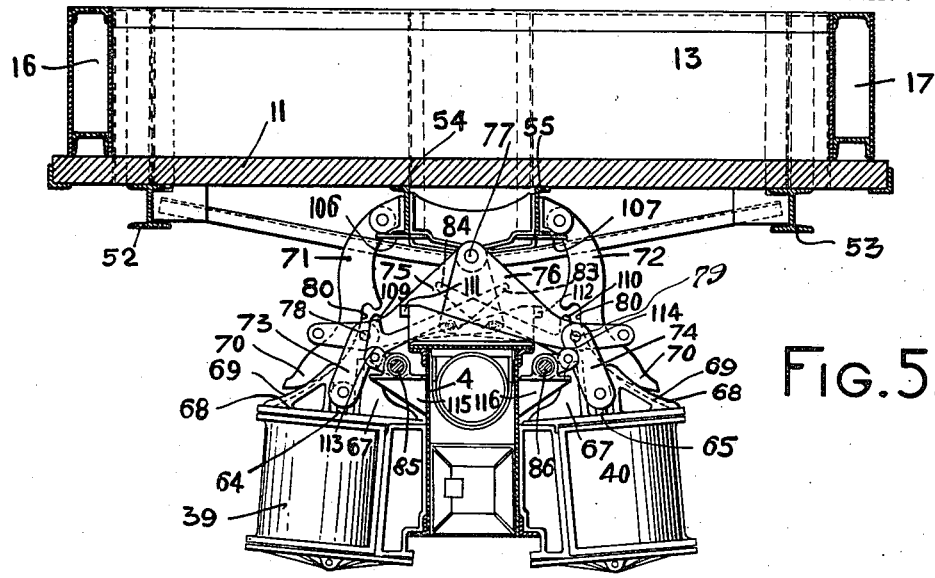
Fig. 5 is a transverse sectional elevation, taken at the line 5—5 of Fig. 2.
Figure 6:
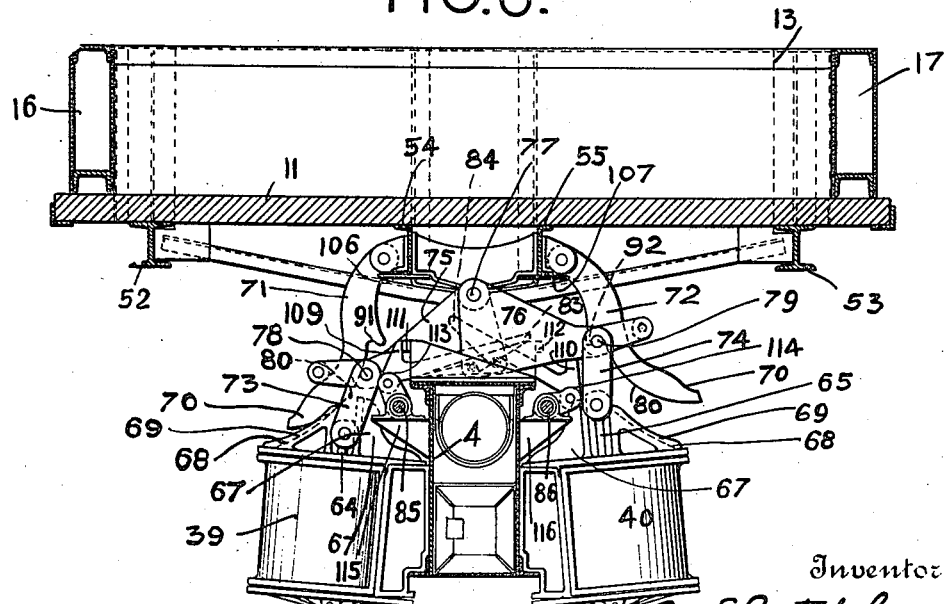
Fig. 6 is a transverse sectional elevation corresponding to Fig. 5, showing the relation of parts during the operation of dumping toward the left, when the left-hand body-support has been swung out of the path of the left-hand depending rollers, and just prior to the time that the right-hand piston begins to rotate the car floor.

From this dumping member, motion is conveyed to the car floor in one way in dumping and in another way in righting. In dumping toward the left, for example, in Figs. 7, 9 and 10, the upward motion of the right-hand piston 65, right-hand connecting link 74 and right-hand dumping member 76 associated therewith, effects at first no motion whatever of the car floor, since during the first portion of the upward travel of the piston 65, the pin 79 connecting the link 74 with the dumping member 76, rides upward idly over the under or inner side 80 of the tail of the right-hand dumping link 72, without producing any effect upon the latter except an outward or counter-clockwise movement thereof. It is during this first portion of the upward travel of the piston 65 that the unlocking and upward or clockwise rotation of the left-hand pivoted body-support 81 are effected through the left unlocking latch 83, left unlocking rock shaft 85, and left toggle 87. The position of the various parts at the beginning of the upward travel of the piston 65 is illustrated in Fig. 5; the position at the end of the first portion of the upward travel of the piston is shown in Figs. 6 and 8, where it will be seen that the left-hand body-support 81 has been swung upward or clockwise out of the path of the left-hand depending rollers 89, and that the right-hand pin 79 has just about reached the notch 92 in the dumping link 72.

During the remainder of the upward travel of the right-hand piston 65, the motion of the pin 79 is transmitted to the right-hand dumping link 72 at the notch 92 therein, and since the dumping link is connected to the car floor 11, this upward movement of the piston 65 tilts the car counter-clockwise, in which position the left-hand vertically sliding blocks 95 forming part of the left-hand shock absorbers 61, rest against the left-hand blocks 97 mounted on the bolsters 5, 6.

During this second portion of the upward travel of the piston 65, the left unlocking latch 83 is moved toward the right by the right-hand dumping member 76 until the upper arm 109 of the latch strikes against a fixed stop 111 mounted upon the center sill 4. Then the continued rightward movement of the latch and its point of connection 113 with the bracket 115 connected to the left rock shaft 85, causes the latch to rotate counter-clockwise about this point of connection 113, and this counter-clockwise rotation of the latch about the point 113 lifts the hook of the latch upward away from its point of engagement with the right-hand dumping member 76, thereby disengaging the latch from the dumping member and permitting the latch, rock shaft 85, toggle 87 and body-support 81 to return counter-clockwise to their normal or locking position as soon as the rollers 89 pass upwardly beyond the upper end of the body-support; this occurs near the end of the succeeding righting movement of the car. An advantage of releasing the left-hand latch 83 during the dumping movement toward the left, is that in this way the latch is sure to be released well before the car is righted, so that the moment the lowermost of the depending rollers 89 passes upwardly beyond the outer surface of the body-support 81 during the righting movement, the body-support at once returns automatically outwardly into locking position, thereby eliminating any danger of the car rebounding into its dumping position toward the left. The body support swings clockwise a sufficient distance to bring it under the roller and therefore into locking position before the righting movement is actually completed, and it reaches its final locking position before, or at the same instant as, the car resumes normal position, whereby the car is automatically and immediately locked against rebound.

The shock upon the swinging car body due to the impact between the blocks 95 and 97 is cushioned by the shock absorbers 61, 62, mounted upon the bolster beams 57. Each of these shock absorbers comprises a horizontal floating pin 100, on which are mounted the oppositely disposed wedge-shaped friction blocks 101, spring-pressed toward each other by the compression springs 102. As the block 95, for example, is forced upward by impact against the fixed block 97, a lower wedge 104 on the sliding block 95 forces the blocks 101 upward against the upper wedge 105, in opposition to the compression springs 102, and this cushioning movement of the sliding block 95 protects the car body and associated parts from the heavy shocks they might otherwise receive at the end of the dumping movement.

The parts are preferably so proportioned that the pin 79 may be in operative engagement with the notch 92 of the dumping link 72 during the entire dumping movement of the link and the car body. With this arrangement, it is possible to effect the entire dumping movement of the car simply by keeping the piston 65 energized from the valve 32 until the piston has completed its upward travel, since at the end of the upward stroke of the piston the pin 79 has forced the dumping link 72 and car body through their entire dumping angle. It will be noted that only the second portion of the upward travel of the piston was utilized in swinging the car floor through its entire dumping angle, owing to the lost motion provided between the pin 79 and notch 92 in order to complete the unlocking of the left-hand body-support 81 during the first part of the upward travel of the right-hand piston 65.

Figure 7:
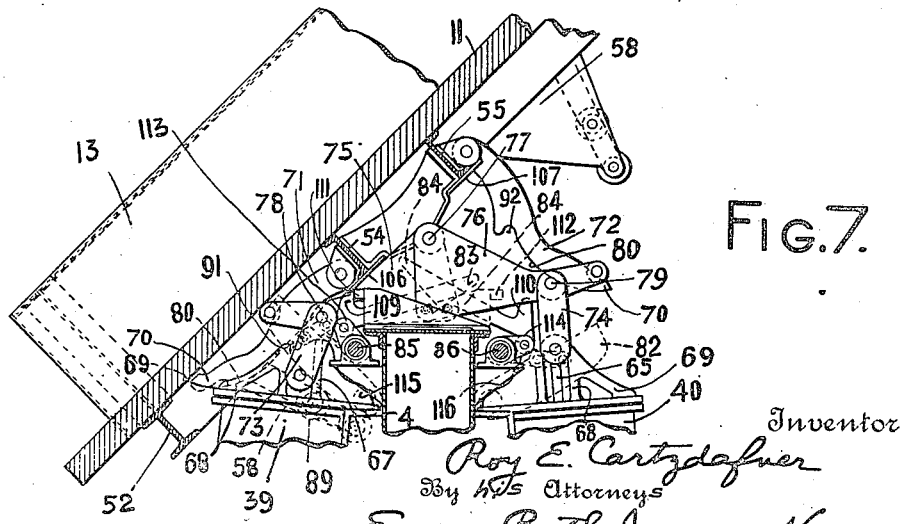
Fig. 7 is a similar view, showing the body-support more clearly.

In returning the car floor from its left-hand dumping position, illustrated in Fig. 7, to its normal or horizontal position shown in Figs. 5, 8 and 9, the valve 32 is shifted to the left (Figs. 9 and 10), to exhaust the right-hand cylinder 40 and admit air under the piston 64 of the left-hand cylinder 39. It will be seen that the tail 70 of the left-hand dumping link 71 is swung far enough outwardly or clockwise by the beveled surface 69 of the outer piston guide 68, so that the notch 91 in this dumping link has traveled downwardly to a point below the pin 78 connecting the left-hand dumping member 75 with the left-hand connecting link 73. This means that as the piston 64 and pin 78 travel upwardly, they do not engage the notch 91 as would be the case during the dumping operation, but instead the upper surface of the dumping member 75 abuts against a plate 106 secured to the left center sill 54 of the car floor 11, shortly after the piston has begun its upward travel. Thereafter for the next portion of the upward travel of the piston, the left dumping member 75, acting against the plate 106, swings the car floor clockwise toward its horizontal or righted position, and simultaneously this left-hand dumping member 75 swings the right-hand unlocking latch 84 toward the left, thereby rotating the right-hand unlocking rock shaft 86 counter-clockwise, unlocking the right-hand toggle 88, and swinging the right-hand body-support 82 upward or counter-clockwise. This counter-clockwise rotation of the right-hand body-support would permit the car floor to pass the horizontal position and overthrow or dump toward the right were it not for the fact that the upper arm 110 of this latch 84 reaches the fixed stop 112 while the piston is moving upwardly, and thus lifts the left end of the latch, disengaging it from the left-hand dumping member 75 and permitting the right-hand rock shaft 86 to rotate clockwise and return the right-hand body-support 82 clockwise to its normal or locking position prior to the time that the dumping member 75 has raised the car floor to horizontal. Thus the body-support is returned to locking position before the car reaches its horizontal position, and there is no danger of overthrow even though the valve 32 remains in its left-hand operating position indefinitely.

The above description has been directed primarily to the operation of dumping toward the left, and righting from this left-hand dumping position. In dumping toward the right, the operation is similar. The valve 32 is shifted manually toward the left, to energize the left-hand cylinders 39. The upward movement of the left-hand piston 64 shifts the connecting link 73 upwardly, and the left-hand dumping member 75 clockwise. During the first portion of the upward travel of the piston, the pin 78 is taking up the lost motion between itself and the notch 91 in the left-hand dumping link 71, and at the same time the right-hand latch 84 is being pulled toward the left by the left-hand dumping member 75, to rotate the right-hand rock shaft 86 counter-clockwise, and thereby unlock the right-hand toggle 88, and then rotate the right-hand body-support 82 counter-clockwise out of engagement with the depending rollers 90, to permit the ensuing clockwise rotation of the car floor into dumping position toward the right. As the left-hand piston 64 continues its upward travel, the pin 78 reaches the notch 91 in the left-hand dumping link 71, and then transmits motion through this dumping link to rotate the car floor clockwise into dumping position toward the right. While the car floor is thus rotating, the upper arm 110 of the right-hand latch 84 reaches the fixed stop 112, causing the latch to be disengaged from the left-hand dumping member 75 and releasing the right-hand rock shaft 86 and its associated toggle 88 and body-support 82, to permit the body-support to rotate clockwise into the locking position the moment the depending rollers 90 pass beyond the outer surface of the body-support in the next righting motion of the car.

In righting the car from its dumping position toward the right, power is applied from the valve 32 to the right-hand cylinder 40. As the right-hand piston 65 moves upwardly, the pin 79 connecting the right-hand connecting link 74 with the right-hand body member 76 does not engage the notch 92 in the right-hand dumping link 72, as would be the case during the dumping operation, but instead the upper surface of the right-hand dumping member 76 abuts against a plate 107 secured to the right center sill 55 of the car floor 11, shortly after the piston has begun its upward travel. Thereafter for the next portion of the upward travel of the piston, the right dumping member 76, acting against the plate 107, swings the car floor counter-clockwise toward its horizontal or righted position, and simultaneously this right-hand dumping member 76 swings the left-hand unlocking latch 83 toward the right, thereby rotating the left-hand unlocking rock shaft 85 clockwise, unlocking the left-hand toggle 87 and swinging the left-hand body-support 81 upward, or clockwise. This clockwise rotation of the left-hand body-support would permit the car floor 11 to pass the horizontal position and overthrow or dump toward the left were it not for the fact that the upper arm 109 of this left-hand latch 83 reaches the fixed stop 111 while the piston is moving upwardly, and thus lifts the right end of the latch, disengaging it from the right-hand dumping member 76 and permitting the left-hand rock shaft 85 to rotate counter-clockwise and return the left-hand body-support 81 counter-clockwise to its normal or locking position before the car reaches its horizontal position, and there is no danger of overthrow even though the valve 32 remain in its right-hand operating position indefinitely.

In connection with the valve mechanism, it may be noted that if auxiliary train-lines 35, 36, are provided, the cylinders 39, 40, may be selectively energized from the valve 32 on the same car as the cylinders, or a similar valve 32 elsewhere in the train may be utilized to operate the cylinders 39, 40 of one or a plurality of cars simultaneously. This multiple unit or train control is not a feature *per se* of the present invention, but, as above stated, is illustrated, described and claimed in a co-pending application of Roy E. Cartzdafner and Horace A. Ketcham, Serial No. 128,349, filed October 28, 1916. In order, however, that the operation of the valve mechanism may be clear without reference to said co-pending application, a preferred arrangement of valves, cylinders, reservoir, train-line, auxiliary train-lines, and connections, is indicated diagrammatically in Figs. 12, 13 and 14. Referring to these figures, and more particularly to Fig. 12, showing the arrangement of parts when the valve 32 is in neutral, it will be seen that with the valve closed, the reservoir 31 may be automatically filled and maintained at a pressure equal to or less than the prevailing train-like pressure, by means of the connection 121 including a check-valve 122, from the train-line 124 to the reservoir 31. When the pressure in the train-line is reduced, as in applying the brakes to the train, the air does not flow from the reservoir into the train-line because the check-valve 122 prevents any air from returning from the reservoir to the train-line. The pipe 34 from reservoir to valve is closed at this time, and the left and right auxiliary train-lines 35 and 36 are not energized, nor are the dumping cylinders 39, 40.

In energizing the left-hand dumping cylinder 39, for the purpose of dumping toward the right or righting from the left-hand dumping position, the handle 154 (Fig. 4) of the valve 32 is turned clockwise (Figs. 9 and 12), to the position shown in Fig. 13. This serves to exhaust the right-hand cylinder 40 to atmosphere at 126, and admits reservoir air through the valve to the left-hand chamber 127 beneath the left plunger 129, so that reservoir pressure is exerted upwardly against the larger pressure area 131 of the left plunger, and since the chamber 127 is connected to the left auxiliary train-line 35, said train-line is now receiving air. This auxiliary train-line pressure exerted upwardly against the larger pressure area 131 of the plunger 129 opposes and overpowers the force exerted downwardly by springs and by reservoir air in the upper chamber 133 against the upper and smaller pressure area 135 of the upper plunger 129, causing the plungers to rise, as indicated in Fig. 13, and admit reservoir air to the left-hand cylinder 39. And since this left auxiliary train-line pressure is similarly exerted in a corresponding lower left-hand chamber 127 of the valve in each car of the train, it will be seen that the left-hand plunger 129, of each valve is simultaneously raised, neglecting for the moment the time required for the flow of air through the left auxiliary train-line. As a result, air is simultaneously admitted from the reservoir on each car, through the upper left-hand chamber 133 of the respective valve, around and beneath the upper pressure area 135 of the plunger 129', to the port leading to the left-hand cylinder 39 of the car, and each car is dumped toward the right, or righted from the left-hand dumping position, as the case may be. An automatic device may be provided to cut off the supply of air to the cylinder when the piston has reached the upper limit of its travel, if desired; but the continued application of air to the left auxiliary train-line, and consequently to the left cylinder 39, will result in nothing except loss of air, since in the righting operation overthrow or accidental dumping is prevented by the body-supports 81, 82, and in the dumping operation the failure to shut off the supply of air from the cylinder 39 would have no effect whatever upon the car.

In energizing the right-hand dumping cylinder 40, for the purpose of dumping toward the left or righting from the right-hand dumping position, the handle 154 (Fig. 4) of the valve 32 is turned counter-clockwise (Fig 12) to the position shown in Fig. 14. This serves to exhaust the left hand cylinder 39 to atmosphere at 125, and admits reservoir air through the valve to the right-hand chamber 128 beneath the right plunger 130, so that reservoir pressure is exerted upwardly against the larger pressure area 132 of the right plunger, and since the chamber 128 is connected to the right auxiliary train-line 36, said train-line is now receiving air from the reservoir through the valve. This auxiliary train-line pressure exerted upwardly against the larger pressure area 132 of the plunger 130 opposes and overpowers the force exerted downwardly by springs and by reservoir air in the upper chamber 134 against the upper and smaller pressure area 136 of the plunger 130', causing the plunger to rise, as indicated in Fig. 14, and admit reservoir air to the right-hand cylinder 40. And since this right auxiliary train-line pressure is similarly exerted in a corresponding lower right-hand chamber 128 of the valve in each car of the train, it will be seen that the right-hand plunger 130 of each valve is simultaneously raised, neglecting for the moment the time required for the flow of air through the right auxiliary train-line. As a result, air is simultaneously admitted from the reservoir on each car, through the upper right-hand chamber of the respective valve, around and beneath the upper pressure area of the right-hand plunger 130', to the port leading to the right-hand cylinder 40 of the car, and each car is dumped toward the left, or righted from the right-hand dumping position, as the case may be.

There may be one or more of the dumping cylinders 39, 40, on each side of the car, depending upon the length and capacity of the car, and other factors incident to manufacturing costs and the nature of the service expected of the car. And similarly the number of shock-absorbers 61, 62, standards 46, floor sills 52, 53, 54, 55, floor bolsters 57, rollers 58, 59, and associated parts, may be varied as desired without departing from the spirit and scope of the present invention. And many if not all of the advantageous features of this invention may be attained in a single-truck car or a motor truck or other vehicle.

The above description has been confined to the dumping and righting of the car floor or body. The doors or sides 16, 17, hereinbefore mentioned, are arranged for operation automatically as the car is dumped and righted, and in order that the structural details of this feature of the invention may be clear, reference may be had to Figs. 2, 4, 9 and 10, particularly Figs. 9 and 10.

The door mechanism on each side of the car includes briefly, one or more sets of devices each comprising a tie bar 138 pivotally mounted on the car floor at a point coaxial with the axis of rotation of the car body; a vertical dump iron 139, pivoted at 140 to the outer end of the tie bar; a gusset 142 fixed upon a top bar 143 and pivoted to the dump iron 139 at a point 144 intermediate the ends thereof; a pivotal support 145 upon the end of the car body for the inner end of the top bar 143; a pivotal support 152 at the outer end of the top bar for the upper end of the door; and a link 146 pivoted to the upper end 147 of the dump iron and extending outwardly to a pivotal connection at 148 with the lower end of the car door.

Figure 10:
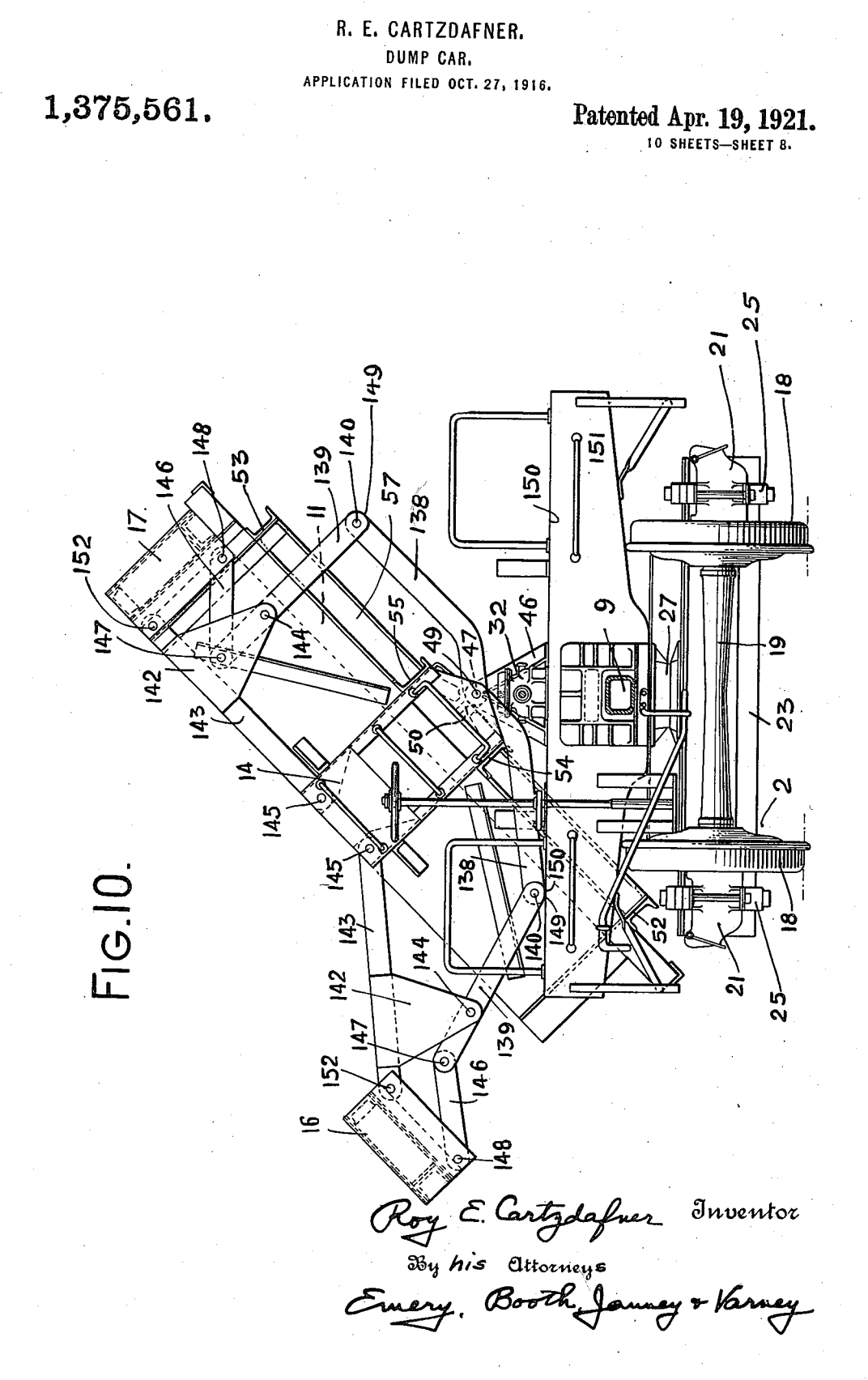

Soon after the car begins to tilt counter-clockwise, for example, as in dumping toward the left from the position indicated in Fig. 9 to the position indicated in Fig. 10, the lower surfaces 149 of the tie bar 138 and dump iron 139 on the left side of the car abut against the upper surface 150 of the end sill 151 of the car, and further downward movement of the tie bar is prevented, thus affording throughout the rest of the dumping movement a fixed position for the tie bar and consequently a fixed pivot 140ª (Fig. 9) for the lower end of the dump iron 139.

Thereafter, during the continued counter-clockwise movement of the car and pivot 145 fixed thereto, the outer end of the top bar 143 begins to rise with respect to the plane of the top of the car body, and the movement of the floating pivot 147 is such that the lower end 148 of the link 146 swings outwardly faster than the outer end 152 of the top bar 143, causing the door to swing outwardly a considerable distance above the car floor. The locations of this door linkage when the car is in its position for dumping toward the left are indicated by construction lines in Fig. 9, and more in detail in Fig. 10.

When the car is dumping toward the left, the door linkage on the right remains in its initial position with the right door 17 closed, because the tie bar 138 on the right side of the car swings upwardly about the pivot point of the car body as an axis, and the relative locations of the several members of the linkage are in no wise disturbed, either in dumping toward the left or in righting the car from the left-hand dumping position.

Similarly when the car is being dumped toward the right, the right-hand door linkage is shifted automatically into the position indicated in construction lines at the right side of Fig. 9, with the door 17 occupying a position considerably above the car body, to permit unobstructed dumping of a load higher than the car doors, and particularly to permit the dumping of large boulders or other solid masses that may be part of the load in the car. When the car is righted from its right-hand dumping position, the right-hand door linkage resumes its door-closing position indicated in detail at the right side of Fig. 9.

When the car is in horizontal position, it will be noted that the inner end 145 of the top bar 143 is fixed, because at this point the top bar is pivoted to the car frame. This means that the upper end 152 of the car door can have no movement relative to the car body except in the arc of a circle about the pivotal point 145 as a center, that is, in an approximately vertical direction from its position indicated in Fig. 9. Any tendency of the top part of the door to move outwardly owing to the load of material in the car is prevented by the top bar 143, at this time under tension. Any tendency of the bottom part 148 of the car door to move outwardly puts the link 146 in tension, causing the vertical dump iron 139 to tend to rotate about its connecting point 144 to the gusset 142 as an axis. The gusset 142 is fixed to the top bar 143. And since the tension in the link 146 is exerted downwardly upon the vertical dump iron 139, this tension opposes and prevents any upward movement of the point 144. The tendency of the vertical dump iron 139 to rotate about the point 144, owing to the tension of the link 146, puts the lower tie bar 138 in compression, but owing to the positioning of the fulcrum 144 above the middle of the dump iron 139, the compression strain in the lower tie bar 138 is less than the horizontal component of the strain in the link 146, and this horizontal component is of course materially less than the total strain of the link, due to the angle that the link makes with the horizontal.

On the right side of the car the door linkage acts in similar manner to lock the doors tightly shut while the car is in horizontal position, and the above description applies to the right-hand door linkage except that on the right side of the car the vertical dump iron 139 tends to rotate clockwise instead of counter-clockwise, as on the left side of the car.

With the above door-operating mechanism, there is provided a simple and reliable means for opening the doors during the dumping movement and for positively closing the doors during the ensuing righting movement, the linkage insuring the complete closing of the doors and preventing accidental opening of the doors at any time. It will be noted furthermore, that the doors are closed without relying upon momentum gained during the righting movement, and that in the dumping position the doors are lifted safely upward out of the way of material in the car, and occupy a position high enough to permit the rapid automatic unloading of boulders or other solid matter exceeding in height the height of the doors.

As indicated in the diagrammatic plan in Fig. 11, the valve 32 is preferably mounted upon the center sill 4 at one end of the car, so that the handle 154 of the valve may be readily shifted by an operator standing on the platform 155 or on the ground. At a point adjacent the valve, connection is made from the brake line or main train-line 124 through a check-valve 122 and pipe 121 to a pipe 34 connecting the reservoir 31 with the valve 32. The reservoir pipe 34, auxiliary train-lines 35, 36, and supply pipes 41, 42 to the dumping cylinders 39, 40, are carried in protected positions upon the center sill 4, and the brake-line is preferably carried inside the center sill as far as possible in order to protect the piping from accidental blows that might injure it.

In the above description and in the accompanying claims, the word valve is intended to be generic to the various types of fluid-controlling devices. The term train-line is ordinarily intended to include a work-circuit of any kind. The words puppet, plunger and cone are used as indicative of any suitable type of valve mechanism serving the purpose set forth. The word car refers to any type of vehicle for land or water transport. And the words left, right, upper and lower are of course merely illustrative of a preferred arrangement of parts.

In view of the above, it will be seen that the several objects of the invention are achieved and other advantageous results attained.

As various possible embodiments might be made of the above invention and as various changes might be made in the embodiments above set forth, it is to be understood that all matter herein set forth or shown in the accompanying drawings is to be interpreted as illustrative and not in a limiting sense.

Having thus revealed my invention, I claim and desire to secure by Letters Patent of the United States:

1. In apparatus of the class described, in combination, an underframe, a car body pivotally mounted thereon, a device resisting by compression the movement of the car body from normal position, means for unlocking said device and swinging the car into dumping position, and means for automatically restoring said device to locking position during the righting movement of the car.

2. In apparatus of the class described, in combination, an underframe, a car body pivotally mounted thereon, a device acting by compression to maintain the car body in normal position, means for unlocking said device and swinging the car into dumping position, and means for releasing said device during the dumping movement to permit said device to resume locking position at the time the car attains normal position in the ensuing righting movement.

3. A dump car combining an underframe mounted on trucks, a car body mounted on the underframe for oscillation about a longitudinal horizontal axis, members acting by compression for normally preventing the rotation of the car body either way from horizontal, whereby transverse sagging of the car body decreases the clearance between the car body and said members, means for selectively shifting the member on one side of the car or the other to permit the car to be dumped, and means for releasing the shifting means during the dumping movement, to permit the return of the shifted member to locking position at the time the car again reaches horizontal position.

4. A dump car combining an oscillating car body, an underframe on which the car body is mounted, means under compression on either side of the car for maintaining the car body in normal position, a pair of cylinders, pistons therein, connections between the pistons and the car body, and means for shifting the first means on one side of the car or the other to permit dumping of the car, the shifting means being operated by the piston during the first part of the working stroke of the piston.

5. A dump car combining an oscillating car body, an underframe on which the car body is mounted, compression means on the car for maintaining the car body in normal position, a cylinder, a piston therein, a connection between the piston and the car body, and means for shifting the first means to permit dumping of the car, the shifting means being operated by the piston during the first part of the working stroke of the piston.

6. A dump car combining an oscillating car body, an underframe on which the car body is mounted, a compression support on the car for maintaining the car body in normal position, a cylinder, a piston therein, a lost motion connection between the piston and the car body, and means for shifting the support to permit dumping of the car, the shifting means being operated by the piston during the first part of the working stroke of the piston, to unlock said support while the piston is taking up said lost motion, whereby the unlocking is effected prior to the time the piston begins to dump the car body.

7. A dump car combining an oscillating car body, an underframe on which the body is mounted, compression body-supports mounted on either side of the underframe and normally locking the car body in normal position, dumping cylinders on either side of the car body, lost-motion connections between said cylinders and the car body, and connections between said cylinders and said body-supports, whereby when one cylinder is energized, the body-support associated therewith is first moved into unlocking position while the lost motion is being taken up, so that the car body is free to move into dumping position when said piston has taken up said lost motion.

8. A dump car combining an oscillating car body, an underframe on which the body is mounted, compression body-supports mounted on either side of the underframe and normally locking the car body in normal position, dumping cylinders on either side of the car body, lost-motion connections between said cylinders and the car body, connections between said cylinders and said body-supports, whereby when one cylinder is energized, the body-support associated therewith is first moved into unlocking position while the lost motion is being taken up, so that the car body is free to move into dumping position when said piston has taken up said lost motion, and means for automatically returning said supports to locking position while the car is resuming normal position, whereby the relocking is made automatically effective whether the car rights itself or is righted by the application of power thereto.

9. A dump car combining an oscillating car body, an underframe on which the car body is mounted, a support on the car for maintaining the car body in normal position independently of the door mechanism, a cylinder, a piston therein, a lost-motion connection between the piston and the car body, means for shifting the support to permit dumping of the car, the shifting means being operated by the piston during the first part of the working stroke of the piston, to unlock said support while the piston is taking up said lost motion, whereby the unlocking is effected prior to the time the piston begins to dump the car body, and means for automatically returning said support to locking position while the car is resuming normal position, whereby the relocking is made automatically effective whether the car rights itself or is righted by the application of power thereto.

10. In apparatus of the class described, in combination, an underframe, a car body pivotally mounted thereon, a cylinder, a piston therein, a member movable with said piston, a support preventing dumping movement of the car body, a latch adapted when engaged with said member to cause said support to be shifted by the movement of the piston, and means for disengaging said latch from said member automatically during the movement of the piston, to permit said support to return to locking position at the complete righting of the car.

11. A dump car combining an underframe, a car body pivotally mounted thereon, a body-support on the underframe and adapted when in locking position to prevent the dumping of the car, a roller mounted on the under side of the car body, means for moving said support into unlocking position to permit the dumping of the car, said roller maintaining said support in unlocking position during the remainder of the dumping movement, and means for causing the support to resume automatically its locking position during the righting of the car whereby when the car resumes its normal position it is immediately locked against dumping.

12. A dump car combining an underframe, a car body pivotally mounted thereon, a body-support on the underframe and adapted when in locking position to prevent the dumping of the car, a roller mounted on the under side of the car body, means for moving said support into unlocking position to permit the dumping of the car, means for disengaging said first means from said support during the dumping movement of the car to permit said support to tend to return to locking position, said roller maintaining said support in unlocking position during the remainder of the dumping movement and during the first portion of the righting movement, the support then automatically resuming locking position prior to the complete righting of the car.

13. A dump car combining an underframe, a car body pivotally mounted thereon, body-supports on either side of the underframe and adapted when in locking position to act under compression to prevent the dumping of the car in either direction, rollers mounted on the under side of the car body on either side of the car, means for selectively moving said supports into unlocking position to permit the dumping of the car, and means for disengaging said first means from said support during the dumping movement of the car to permit said supports to tend to return to locking position, said rollers maintaining said supports in unlocking position during the remainder of the dumping movement and during the first portion of the righting movement, the supports then automatically resuming locking position prior to the complete righting of the car.

14. A dump car combining a car body, an underframe on which the car body is pivotally mounted, a dumping device, a support on the underframe for resisting by compression the rotation of the car body from normal position, a toggle device maintaining said support in locking position against accidental displacement from said position, and means actuated by the dumping device for shifting the toggle to unlocking position to permit dumping of the car.

15. In apparatus of the class described, a car body, a door, an underframe on which the car body is pivotally mounted, a support resisting the dumping movement of the car, a device for shifting said support into unlocking position to permit the dumping of the car, and dumping the car, and mechanism for automatically opening the door and raising it above the car body during the dumping movement.

16. In apparatus of the class described, in combination, a car body provided with a door, an underframe on which the car body is pivotally mounted, a support for resisting by compression the dumping movement of the car, a power-operated device for first shifting said support into unlocking position to permit the dumping of the car, and then dumping the car, mechanism for automatically opening the door and raising it above the car body during the dumping movement, and means for releasing the support before the car again reaches normal position to cause it to return automatically to locking position.

17. In apparatus of the class described, in combination, a car body provided with a door, an underframe on which the car body is pivotally mounted, a support for resisting by compression the dumping movement of the car, a power-operated device for first shifting said support into unlocking position to permit the dumping of the car, and then dumping the car, mechanism for automatically opening the door and raising it above the car body during the dumping movement, means for releasing the support before the car again reaches normal position to cause it to return automatically to locking position, and a second power-operated device for righting the car, the door mechanism automatically closing the door during the righting movement.

18. A dump car combining a car body, an underframe on which the car body is pivotally mounted for limited oscillation about the longitudinal axis, a dumping device comprising a cylinder and piston, a support between the underframe and the car body for resisting by compression the rotation of the car body from normal position, a toggle device for maintaining said support in locking position against accidental displacement from said position, and means actuated by the dumping device for shifting the toggle to unlocking position to permit dumping of the car.

19. A dump car combining an underframe mounted on trucks, a car body mounted on the underframe for oscillation about a longitudinal horizontal axis, a compression member on each side of the car for normally preventing the rotation of the car body from horizontal, whereby transverse sagging of the car body decreases the clearance between the car body and said members, a rock shaft on each side, an arm on each rock shaft, a link operatively connecting each compression member to a corresponding rock shaft arm for control thereby, dumping means on each side having a lost motion connection with the car body, and connections between the dumping means and rock shafts to cause the release of a compression member during the first part of the movement of the dumping means to permit dumping.

In testimony whereof, I have signed my name to this specification this 26th day of October, 1916.

ROY E. CARTZDAFNER.